(12) United States Patent
Gu et al.

(10) Patent No.: US 8,798,848 B2
(45) Date of Patent: Aug. 5, 2014

(54) METHOD FOR DETECTING WHETHER PERFORMANCE OF AIRCRAFT COMPONENTS IS IN THE DETERIORATION PERIOD

(75) Inventors: Zhuping Gu, Zhejiang Province (CN); Huifeng Ding, Zhejiang Province (CN); Fengliang Zheng, Zhejiang Province (CN); Yubin Wu, Zhejiang Province (CN); Jiaju Wu, Zhejiang Province (CN); Yi Zhu, Zhejiang Province (CN); Bingzheng Wang, Zhejiang Province (CN); Hongtao Ma, Zhejiang Province (CN); Lei Huang, Zhejiang Province (CN)

(73) Assignee: Air China Limited, Beijing (CN)

( * ) Notice: Subject to any disclaimer, the term of this patent is extended or adjusted under 35 U.S.C. 154(b) by 0 days.

(21) Appl. No.: 13/543,507

(22) Filed: Jul. 6, 2012

(65) Prior Publication Data

US 2013/0179028 A1 Jul. 11, 2013

(30) Foreign Application Priority Data

Jul. 7, 2011 (CN) .......................... 2011 1 0189470

(51) Int. Cl.
*G06F 17/00* (2006.01)
*G06F 17/17* (2006.01)
*G06F 17/18* (2006.01)
*G05B 23/02* (2006.01)

(52) U.S. Cl.
CPC ............ *G06F 17/00* (2013.01); *G05B 23/0275* (2013.01)

USPC ........................................................ 701/29.4

(58) Field of Classification Search
CPC ......... G06F 17/00; G06F 17/14; G06Q 10/06; G06Q 50/30; B60G 17/0195; B64F 5/0045; G05B 19/4184; G01S 13/951; H04L 29/06027
USPC ........... 701/1, 29.1, 29.4, 32.1, 3, 8; 382/141; 702/184, 185; 342/26, 196; 370/230; 340/540
See application file for complete search history.

(56) References Cited

U.S. PATENT DOCUMENTS

| | | | | |
|---|---|---|---|---|
| 5,973,635 A * | 10/1999 | Albo | ........................... | 342/26 D |
| 6,078,281 A * | 6/2000 | Milkovich et al. | ............ | 342/196 |
| 6,529,620 B2 * | 3/2003 | Thompson | ..................... | 382/141 |
| 6,922,616 B2 * | 7/2005 | Obradovich et al. | ............. | 701/1 |
| 8,340,854 B2 * | 12/2012 | Doulatshahi et al. | ......... | 701/29.1 |
| 2002/0105909 A1 * | 8/2002 | Flanagan et al. | .............. | 370/230 |
| 2003/0130770 A1 * | 7/2003 | Matos | ................ | 701/3 |
| 2004/0172227 A1 * | 9/2004 | Aragones | .......................... | 703/8 |
| 2005/0143956 A1 * | 6/2005 | Long et al. | .................... | 702/184 |
| 2005/0209823 A1 * | 9/2005 | Nguyen et al. | ................. | 702/185 |
| 2009/0312897 A1 * | 12/2009 | Jamrosz et al. | .................. | 701/29 |
| 2010/0164718 A1 * | 7/2010 | Parish et al. | ................... | 340/540 |
| 2013/0179028 A1 * | 7/2013 | Gu et al. | ..................... | 701/29.4 |

* cited by examiner

*Primary Examiner* — Tuan C. To
*Assistant Examiner* — Yuri Kan
(74) *Attorney, Agent, or Firm* — Nath, Goldberg & Meyer; Jerald L. Meyer; Stanley N. Protigal

(57) ABSTRACT

The present application discloses a method for detecting whether performance of an aircraft component is in a decline period, comprising: obtaining one or more detection parameters reflecting operation status of the aircraft component; comparing data of the one or more detection parameters with respective desired values; and determining whether the performance of the aircraft component is in the decline period based on a comparison result.

31 Claims, 11 Drawing Sheets

APU MES/IDLE REPORT <13>

| | A/C ID | DATE UTC | | FROM | TO | FLT | |
|---|---|---|---|---|---|---|---|
| | Aircraft ID | UTC Time | | Taking off | Landing | Flight No. | |
| CC | BXXXX | yyyy-dd-mm xx:xx:xx | | - | - | - | |
| | PH | CNT | CODE | BLEED STATUS | | APU | |
| | Phase | Count | Trigger Code | | | APU Bleed valve | |
| C1 | 11 | 76401 | 4000 | 16 0000 1 00000 19 | | 1 | |
| | TAT | ALT | CAS | MN | GW | CG | DMU |
| | Total Temperature | Altitude | Calculated Speed | Mach Number | Gross Weight | Center of Gravity | Version |
| CE | 23.3 | 150 | - | - | 65600 | 29.2 | I71CA2 |
| | ASN | AHRS | ACYC | PHAD | | | |
| | APU Serial Number | APU Hours | APU Cycles | APU Physical Adjustment | | | |
| E1 | 2056 | 18477 | 16894 | 4000 | | | |
| | ESN | ACW1 | ACW2 | NA | EGTA | IGV | |
| | Engine Serial Number | APU Control Word 1 | APU Control Word 2 | Rotation Speed | Exhaust Gas Temperature of APU | IGVPosition | |
| N1 | 011909 | 00000 | 0A000 | 99.7 | 588 | -5 | |
| N2 | 011473 | 00000 | 0A000 | 99.8 | 580 | -5 | |
| N3 | 000000 | 00000 | 04000 | 99.8 | 388 | 82 | |
| | P2A | LCIT | WB | PT | LCDT | OTA | GLA |
| | Inlet Pressure | Load Compressor Inlet Temperature | Flow Rate of Bleed Air | Pressure of Bleed Air | Load Compressor Inlet Temperature | Oil Temperature of APU | Generator Load of APU |
| S1 | .956 | 33 | .41 | 3.99 | XXXX | 110 | 38 |
| S2 | .952 | 32 | .41 | 3.99 | XXXX | 110 | 27 |
| S3 | .96 | 32 | 0 | 1.17 | XXXX | 107 | 0 |
| PREVIOUS APU START | | | | | | | |
| | STA | EGIP | NPA | OTA | ICIT | | |
| | Starting Time of APU | EGT Peak Value | Peak Value EGT Rotation Speed | Oil Temperature of APU | Load Compressor Inlet Temperature | | |
| V1 | 49 | 808 | 35 | 110 | 32 | | 20 |

Fig.8

METHOD FOR DETECTING WHETHER PERFORMANCE OF AIRCRAFT COMPONENTS IS IN THE DETERIORATION PERIOD

TECHNICAL FIELD OF THE INVENTION

The present application relates to a method related to the maintenance of an aircraft, in particular to a method for detecting whether the performance of the aircraft components is in the decline period.

BACKGROUND

Aircraft is an important vehicle. A lots of passengers travel by flying everyday. Therefore, the safety of flight must be ensured. When a component of the aircraft fails, the aircraft must be grounded and maintained until problems are resolved. Thus, it is possible that the aircraft is delayed and even grounded once a component of the aircraft fails.

At present, maintenance of the aircraft mainly is post-processing or performed on a fixed schedule. As mentioned above, post-processing is hard to avoid delay and grounding of the aircraft, since maintenance of some parts of the aircraft is a time-consuming process. Sometimes, there are no spare parts in the airport for replacing due to high price or using up thereof, which will directly cause grounding of the aircraft. Maintaining on a fixed schedule means a certain component of the aircraft is maintained or replaced after a fixed time, which can avoid delay or grounding of the aircraft to some extent, however, its cost is too high. In particular to some expensive parts, their performance may be well when they are replaced, which is huge waste. Furthermore, under some special circumstances, some components of the aircraft may decline quickly. And in this case, maintenance according to a fixed schedule cannot avoid the delay and grounding of the aircraft completely.

SUMMARY

To the one or more technical problems in the conventional technology, in one aspect of the present application, there provides a method for detecting whether performance of an aircraft component is in a decline period, comprising: obtaining one or more detection parameters reflecting operation status of the aircraft component; comparing data of the one or more detection parameters with respective desired values; and determining whether the performance of the aircraft component is in the decline period based on a comparison result.

In another aspect, there provides a method for maintaining an aircraft, comprising: determining whether the performance of the aircraft component is in the decline period based on the above method; arranging a maintenance schedule of the aircraft in response to the performance of the aircraft component being in the decline period; and maintaining the aircraft component of the aircraft.

In further aspect, there provides a method for obtaining one or more detection parameters reflecting operation status of an aircraft component, comprising: obtaining multiple parameters related to operation status of the aircraft component; associating data of the multiple parameters with failure events of the aircraft component; and determining the detection parameters based on the associations between the multiple parameters and the failure events.

BRIEF DESCRIPTION OF THE DRAWINGS

Hereinafter, some preferred embodiments of the invention will be described in reference to the accompanying drawings.

FIG. 8 is a schematic illustrating an example of A13 message of Airbus.

BRIEF DESCRIPTION OF THE DRAWINGS

Figure 1:
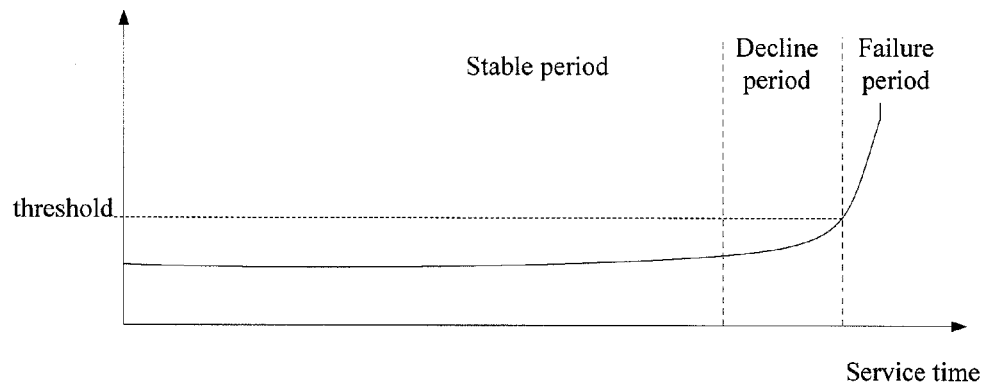
FIG. 1 is a schematic illustrating change of the performance of the aircraft components according the one embodiment of the present application.

FIG. 1 is a schematic illustrating change of the performance of the aircraft components according the one embodiment of the present application. As service time increases, the performance of all of parts of the aircraft will deteriorate gradually, i.e., the decline indexes will gradually increase. The decline indexes indicate a speed at which the performance of parts of the aircraft declines. When the decline indexes are relatively stable, the performance of the aircraft components is in a stable period; when performance decline of the aircraft components gradually accelerates, the performance of the aircraft components enters a decline period; when a certain threshold value is exceeded, the performance of the aircraft components enters a failure period, and failure may occur at any time. When the aircraft components enter the failure period, the quality of service and safety of flight will suffer bad influence, and an unscheduled maintenance may be generated easily which can cause delay and grounding of the aircraft. There is no means in conventional technology to detect whether the performance of the aircraft component is in the decline period.

The detection of decline period has the following advantages: firstly, when the aircraft components enter decline period, the probability of failure still is low. Therefore, safety of flight and the quality of service will be guaranteed if the aircraft is maintained at this time. Secondly, when it is determined the aircraft components enter the failure period, the airline can timely arrange maintenance for the aircraft, so as to avoid unscheduled maintenance, reduce the delay of the aircraft and the waste of cost of maintenance caused by maintaining according to a fixed schedule Certainly, embodiments of the present invention also can be applied to detect whether the performance of the aircraft component is in the failure period.

Figure 2:
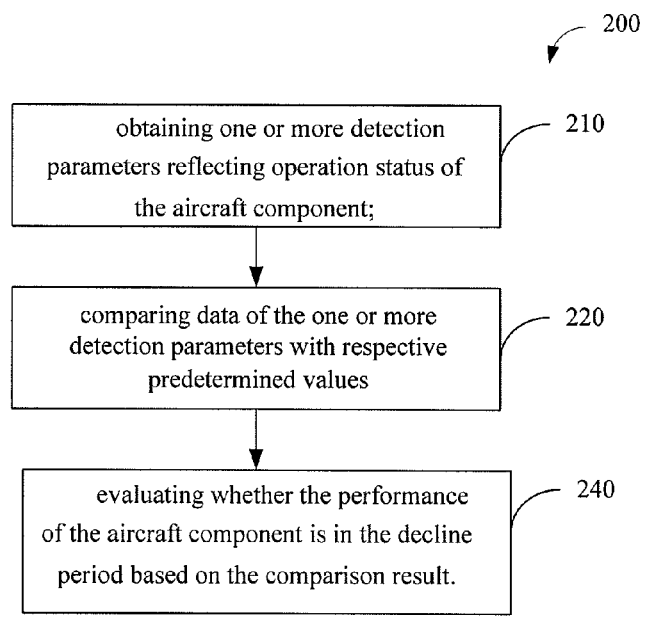
FIG. 2 is a flow chart illustrating a method for detecting whether the performance of the aircraft components is in the decline period according the one embodiment of the present application.

FIG. 2 is a flow chart illustrating a method for detecting whether the performance of the aircraft components is in the decline period according the one embodiment of the present application. In the method 200 in this embodiment, at step 210, one or more detection parameters of the operation status of the aircraft components are obtained. At step 220, the values of the obtained one or more detection parameters are compared with their respective predetermined values. And at step 240, it is determined whether the performance of the aircraft components is in the decline period based on the comparison result.

For performing detection of the operation status of the aircraft components, the first problem required to be solved is which parameters need to be detected, i.e., which parameters reflecting the operation status of the aircraft components are selected as detection parameters. Taking the A320 aircraft of Airbus as an example, the amount of data obtained by the aircraft summed up to more than 13000, wherein, a plurality of data among them can directly or indirectly reflect the performance of the aircraft components. Therefore, it is a difficult problem how to select a suitable detection parameter from so many parameters reflecting the performance of the aircraft components, especially for parts having more complicated structures.

Figure 3:
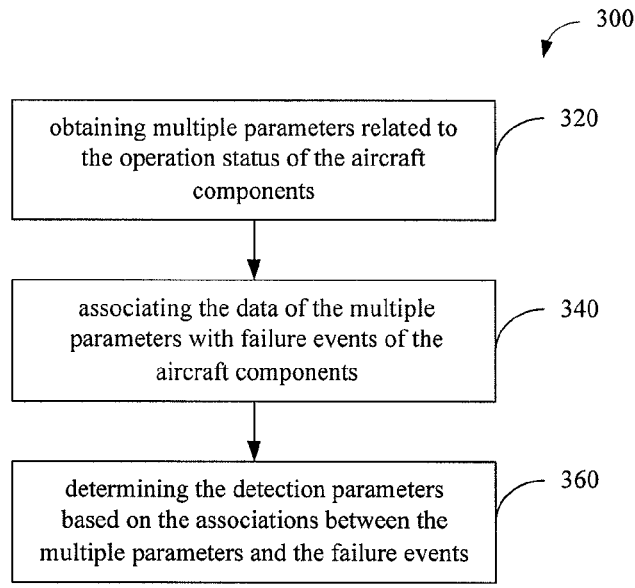
FIG. 3 is a flow chart illustrating a method for obtaining detection parameters reflecting the operation status of the aircraft components according the one embodiment of the present application.

FIG. 3 is a flow chart illustrating a method for obtaining detection parameters reflecting the operation status of the aircraft components according the one embodiment of the present application. As shown, the method 300 for obtaining detection parameters in this embodiment comprises: at step 320, obtaining multiple parameters related to the operation status of the aircraft components; at step 340, associating the data of the multiple parameters with failure events of the aircraft components; and at step 360, determining the detection parameters based on the associations between the multiple parameters and the failure events.

At step 320, the multiple parameters related to the operation status of the aircraft components can be all or a part of the parameters obtained by the aircraft data system. According to respective physical implications indicated by parameters, a large part of parameters completely unrelated to the aircraft components to be detected can be excluded. According to one embodiment of the present application, the detection parameters are determined based on respective physical implications indicated by parameters related to the operation status of the aircraft components.

It is can be determined which parameters are highly related to the failure events of the aircraft components through data mining utilizing existing data of the multiple parameters related to the operation status of the aircraft components when failures occurred to the aircraft components, so that the range of the detection parameters is determined.

According to one embodiment of the present application, a correlation between the data change of the multiple parameters and the failure events of the aircraft components is calculated. The failure events can directly influence the decline of some parameters. For example, if a crew oxygen system has a leak, a crew oxygen pressure parameter would drop rapidly. If an engine malfunctions, a rotation speed of the engine would drop rapidly. The declines of these parameters indicate that failures occur. The correlation calculated between a parameter of the operation status of the aircraft components and a parameter indicating failure event can reflect a correlation between the parameter and the failure event. According to one embodiment of the present application, the correlation between the parameter relevant to the operation status of the aircraft components and the parameter indicating the failure event can be calculated using the partial correlation method. A plurality of partial correlation analysis methods in statistics can be applied to the embodiment. If the correlation calculated between the parameter and the failure event is greater than a threshold, the parameter can be used as a detection parameter. The detection parameters reflecting operation status of the aircraft components can be determined through testing all of parameters related to operation status of the aircraft components using such a method.

The value of the threshold determines the number of the final obtained detection parameters, and the accuracy of the performance detection. Certainly, the more the number of the parameters is, the more accurate the detection is, and the higher the cost of the method is. If the performance of the aircraft components relates to multiple parameters, and the correlation of each parameter is not high, the value of the threshold should be lowered to get more parameters. According to one embodiment of the present application, a range of the threshold is 0.3-0.5. If the performance of the aircraft components relates to a few parameters, and correlations of certain parameters are strong, the value of the threshold can be higher to reduce unnecessary detection. According to one embodiment of the present application, a range of the threshold is 0.6-0.8.

After obtaining a plurality of detection parameters, it is possible that the correlations between the obtained detection parameters are strong. In this case, one detection parameter may indicate another one parameter. Therefore, some detection parameters can be removed through detecting the correlations. According to one embodiment of the present application, the method comprises: calculating correlations between multiple detection parameters; and removing one or more detection parameters based on the correlations between the multiple detection parameters. Thus, multiple detection parameters can be obtained, which are independent relatively and can reflect operation status of the aircraft components.

The degree of decline of a detection parameter can be directly reflected through comparing a measured value of the detection parameter with an extreme value of the detection parameter. Given the measured value of the detection parameter must be controlled within the extreme value of the detection parameter, it can be concluded that the detection parameter deteriorates and the performance of the component may be in the decline period, when the measured value of the detection parameter is close to the extreme value. Given the measured value of the detection parameter is allowed to exceed the extreme value of the detection parameter, it can be concluded that the detection parameter deteriorates and the performance of the component may be in the decline period, when the measured value of the detection parameter is close to or exceeds the extreme value. Through integrating the detection results of multiple detection parameters, it can be determined more accurately that the performance of the aircraft components is in the decline period. According to one embodiment of the present application, measured values of each detection parameters are converted into values under a specific condition so as to obtain more accurate result.

Figure 4:
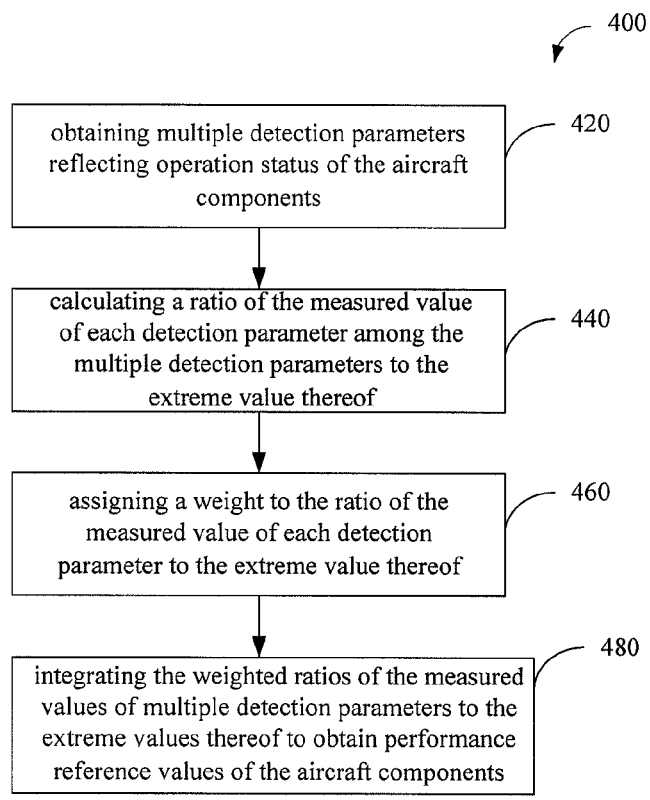
FIG. 4 is a flow chart illustrating a method for detecting the performance of the aircraft components according the one embodiment of the present application.

FIG. 4 is a flow chart illustrating a method for detecting the performance of the aircraft components according the one embodiment of the present application. As shown, the method 400 in this embodiment comprises: at step 420, obtaining multiple detection parameters reflecting operation status of the aircraft components; at step 440, calculating a ratio of the measured value of each detection parameter among the multiple detection parameters to the extreme value thereof; at step 460, assigning a weight to the ratio of the measured value of each detection parameter to the extreme value thereof; and at step 480, integrating the weighted ratios of the measured values of multiple detection parameters to the extreme values thereof to obtain performance reference values of the aircraft components. And thus it is determined whether the performance of the aircraft components is in the decline period.

Respective weights of detection parameters can be estimated according to actual data. According to one embodiment of the present application, the weight of each detection parameter is obtained based on the correlation between data change of the multiple detection parameters and failure events of the aircraft component.

According to one embodiment of the present application, it is determined that the performance of the aircraft component is in the decline period when the performance reference value of the aircraft component is greater than a threshold. Generally, the threshold needs to be estimated based on actual data.

Figure 5:
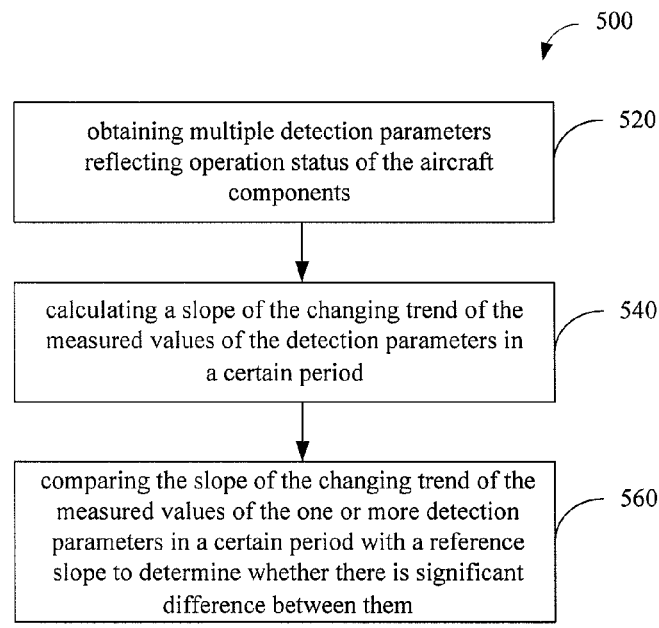
FIG. 5 is a flow chart illustrating a method for detecting the performance of the aircraft components according the one embodiment of the present application.

FIG. 5 is a flow chart illustrating a method for detecting the performance of the aircraft components according the one embodiment of the present application. As shown, the method 500 in this embodiment comprises: at step 520, obtaining multiple detection parameters reflecting operation status of the aircraft components; and at step 540, calculating a slope of the change trend of the measured values of the detection parameters in a certain period.

As service time increases, the performance of the aircraft components deteriorates gradually. This characteristic can be reflected by the following formula:

$$X=\beta 0+\beta 1 t_0 \quad (1)$$

wherein, X is a measured value of the detection parameter, $t_0$ an installation time of the aircraft component, β0 和 β1 are fitting parameters. β1 is a slope reflecting the changing trend of the detection parameter.

At step 560, the slope of the changing trend of the measured values of the one or more detection parameters in a certain period is compared with a reference slope to determine whether there is significant difference between them. It is determined that the performance of the aircraft component is in the decline period when the slope changes significantly relative to the reference slope.

According to one embodiment of the present application, the reference slope is a slope of change trend in a certain period after the aircraft component is installed. According to another one embodiment of the present application, the reference slope is a slope of change trend in a certain period of the same aircraft component having good working condition in another aircraft of the same model. Through this method, change that happens in same aircraft in different periods can be identified, and comparison can be performed between different aircrafts.

According to one embodiment of the present application, the measured values of the detection parameters can be replaced with the converted values under the specific condition.

According to one embodiment of the present application, the measured values of the detection parameters are performed smooth processing to reduce influence caused by data perturbation. The smooth processing adopts multipoint average rolling mean algorithm. The following formula is applied:

$$X_{new}=C1 X_{smooth}+C2 X_{old} \quad (2)$$

wherein, $X_{old}$ is the measured value, $X_{new}$ is the value after smooth processing, $X_{smooth}$ is the value of adjacent points after smooth processing or is the average value of points around the current point, C1 and C2 are the weight values and C1 is generally much greater than C2 so as to improve effect of smooth processing.

Figure 6:
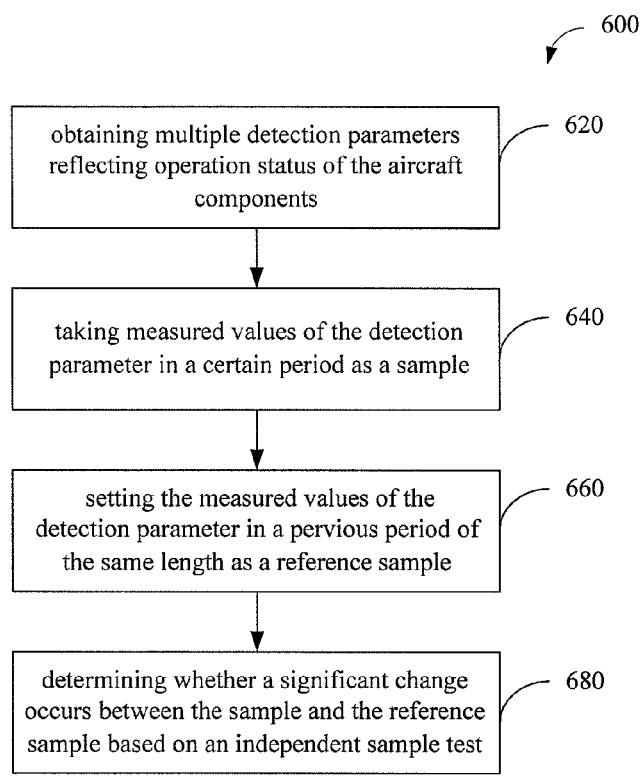
FIG. 6 is a flow chart illustrating a method for detecting the performance of the aircraft components according the one embodiment of the present application.

FIG. 6 is a flow chart illustrating a method for detecting the performance of the aircraft components according the one embodiment of the present application. As shown, the method 600 in this embodiment comprises: at step 620, obtaining multiple detection parameters reflecting operation status of the aircraft components; at step 640, taking measured values of the detection parameter in a certain period as a sample; at step 660, setting the measured values of the detection parameter in a pervious period of the same length as a reference sample; and at step 680, determining whether a significant change occurs between the sample and the reference sample based on an independent sample test.

A plurality of independent sample tests can be applied to the embodiment. It is determined that the performance of the aircraft component is in the decline period, when there is significant change between the sample of measured values of one or more detection parameters and their respective reference samples.

According to one embodiment of the present application, measured values of detection parameters can be replaced with converted values under specific status.

When the performance of the aircraft component is in the decline period according to above method, maintenance of the aircraft can be arranged duly corresponding to the fact that the performance of the aircraft is in the decline period so as to maintain the aircraft component.

Example of the APU (Airborne Auxiliary Power Unit)

APU (Airborne Auxiliary Power Unit) is a small turbine engine mounted at the tail of an aircraft. The main function of the APU is to provide power and gas source, and a few APUs may provide additive thrust to the aircraft. In particular, the APU supplies power to start a main engine before the aircraft takes off from ground without need to rely on a ground power, gas source vehicle to start the aircraft. When on the ground, APU also supplies power and compressed air to ensure the lighting and air-conditioning in the cockpit and cabin. When the aircraft takes off, the APU can be used as a backup power. After landing, APU still supplies power to the lighting and air-conditioning.

The functions of APU determine the operation stability thereof directly relates to flight cost and quality of service of the aircraft. Moreover, in the absence of guarantees of the ground power and gas source, once there is some malfunction of the APU, the result is that the aircraft cannot fly. At present, the troubleshooting and maintenance of the APU always are post-processing. However, among the equipments of aircraft, the maintenance cost of APU is higher. In addition, the price of parts of APU is higher, the cost for storing the spare parts is higher, and the repair cycle reaches up to 4-5 months. The stable operation of the APU cannot be guaranteed due to the post-processing maintenance. Moreover, the repair cycle is time-consuming, which directly causes the aircraft delays even to be grounded.

Figure 7:
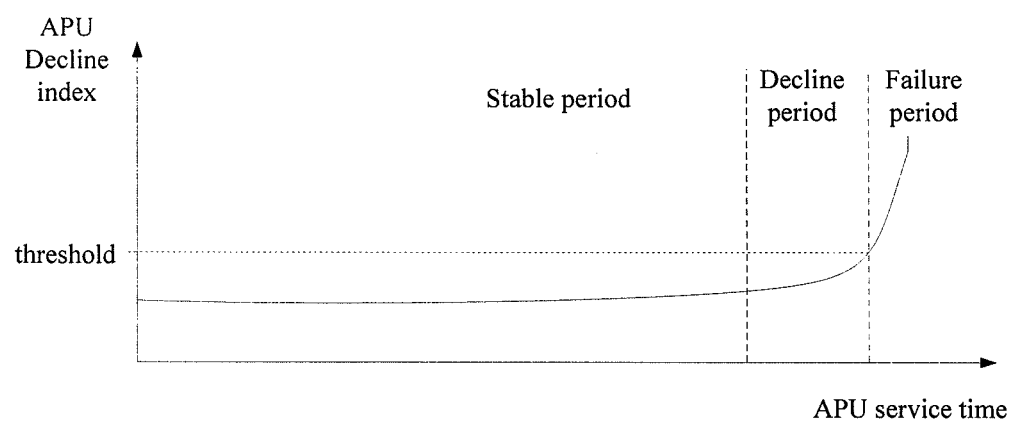
FIG. 7 is a schematic illustrating change of the performance of an APU according the one embodiment of the present application.

FIG. 7 is a schematic illustrating a curve of the performance of the APU according to one embodiment of the present application. As service time increases, performance of all of APU gradually deteriorates, i.e., the decline indexes gradually increases. When the decline indexes of the APU is relatively steady, the performance of the APU is in a stable period; when performance degradation of the APU gradually accelerates, the performance of the APU enters a decline period; when a certain threshold value is exceeded, the performance of the APU enters a failure period, and failure may occur at any time. When the APU enters the failure period, the use of the APU is influenced, the quality of service and safety of flight also suffer bad influence, and an unscheduled maintenance may be generated easily which can cause delay and grounding of the aircraft. There is no means in conventional technology to detect whether the performance of the APU is in the decline period. However, some embodiments of the present application can perform such detection.

FIG. 8 is a schematic illustrating an example of A13 message of Airbus. As shown, the A13 message mainly includes four parts of information, which respectively are a header, an APU history information, an operation parameter for starting the aircraft engine and an APU starting parameter.

The header is composed of CC section and C1 section including mainly the following information: flight information of the aircraft, leg in which the message is generated, the state of the bleed air valve, total air temperature (i.e., external temperature) and like. The APU history information is composed of E1 section including the following information: the APU serial number, service hours and circulation and like. The operation parameter for starting the aircraft engine is composed of N1-S3 sections, wherein, N1 and S1 indicate the operation status when the first aircraft engine is started, N2 and S2 indicate the operation status when the second aircraft engine is started, and N3 and S3 indicate the status after the APU starts the engines successfully and when the aircraft is running slowly.

The A13 message includes a plurality of parameters relating to operation status of the APU. The operation parameter for starting the aircraft engine includes the EGT (exhaust gas temperature), the opening angle of the IGV, the inlet pressure of the compressor, the load compressor inlet temperature, the flow rate of the bleed air, the pressure of the bleed air, the oil temperature and the APU generator load. The parameter when the APU starts includes the starting time, the peak value of the EGT, the rotation speed at the peak value of EGT and the load compressor inlet temperature.

The performance of the APU may relate to other parameters, in addition to the parameters in the A13 message. Taking the aircraft A320 of Airbus as an example, the amount of system data obtained by the aircraft can reach up to more than 13,000, wherein, a plurality of data can directly or indirectly reflect the performance of the APU.

As to the engine, there are two most important indicators influencing the heat engine, one is the service time, another is EGT (Exhaust Gas Temperature). From the physical view, the service time is a very important parameter. When the APU fails, the EGT of the APU would increase and be close to an extreme value. Therefore, valuable information can be obtained from these two parameters. In this embodiment, the external influence, such as the altitude, total temperature, loads of generator, flow rate of bleed air, inlet pressure, load compressor inlet temperature, is removed through a method of partial correlation. The following result is obtained by performing a data analysis on actual data of the APU.

| Control Variables | Variables | description | Correlations | | | | | |
|---|---|---|---|---|---|---|---|---|
| | | | TSR | STA | EGTA_EMAX | IGV_EMAX | PT_EMAX | OTA_EMAX |
| Altitude & total temperature & loads of generator & flow rate of bleed air & inlet pressure & load compressor inlet temperature | TSR | Correlation | 1.00 | 0.23 | 0.24 | −0.06 | −0.02 | 0.29 |
| | | Significance 2-tailed) | . | 0.00 | 0.00 | 0.00 | 0.06 | 0.00 |
| | | df | 0.00 | 11023.00 | 11023.00 | 11023.00 | 11023.00 | 11023.00 |
| | STA | Correlation | 0.23 | 1.00 | 0.33 | −0.04 | −0.10 | 0.32 |
| | | Significance 2-tailed) | 0.00 | . | 0.00 | 0.00 | 0.00 | 0.00 |
| | | df | 11023.00 | 0.00 | 11023.00 | 11023.00 | 11023.00 | 11023.00 |
| | LGTA_EMAX | Correlation | 0.24 | 0.33 | 1.00 | −0.51 | 0.20 | −0.01 |
| | | Significance 2-tailed) | 0.00 | 0.00 | . | 0.00 | 0.00 | 0.19 |
| | | df | 11023.00 | 11023.00 | 0.00 | 11023.00 | 11023.00 | 11023.00 |
| | IGV_EMAX | Correlation | −0.06 | −0.04 | −0.51 | 1.00 | −0.40 | 0.55 |
| | | Significance 2-tailed) | 0.00 | 0.00 | 0.00 | . | 0.00 | 0.00 |
| | | df | 11023.00 | 11023.00 | 11023.00 | 0.00 | 11023.00 | 11023.00 |
| | PT_EMAX | Correlation | −0.02 | −0.10 | 0.20 | −0.41 | 1.00 | −0.21 |
| | | Significance 2-tailed) | 0.06 | 0.00 | 0.00 | 0.00 | . | 0.00 |
| | | df | 11023.00 | 11023.00 | 11023.00 | 11023.00 | 0.00 | 11023.00 |
| | OTA_EMAX | Correlation | 0.29 | 0.32 | −0.01 | 0.55 | −0.21 | 1.00 |
| | | Significance 2-tailed) | 0.00 | 0.00 | 0.19 | 0.00 | 0.00 | . |
| | | df | 11023.00 | 11023.00 | 11023.00 | 11023.00 | 11023.00 | 0.00 |

In this embodiment, a correlation r is divided into three levels: |r|<0.4, which means the correlation is a low linear correlation; 0.4≤|r|<0.7, which means the correlation is a significant correlation; 0.7≤|r|<1, which means the correlation is a high linear correlation.

It is obtained through analysis that the correlations between TSR (service time), STA (starting time), EGT (Exhaust Gas Temperature) and PT (pressure of bleed air) are low, however, the correlations between an angle of IGV (Inlet Guide Vane) and TSR, STA, EGT and PT and the correlations between OTA (Oil temperature) and TSR, STA, EGT and PT are strong.

It can be seen from the above, the angle of the IGV and OTA can be represented by the TSR, STA, EGT and PT, when the aircraft components operate normally. It also can be seen that the TSR, STA, EGT and PT are relatively independent relatively, and each of them indicates a certain operation character of the APU. The overall performance of the APU can be reflected through effective combination of these four parameters utilizing characters thereof.

Figure 9:
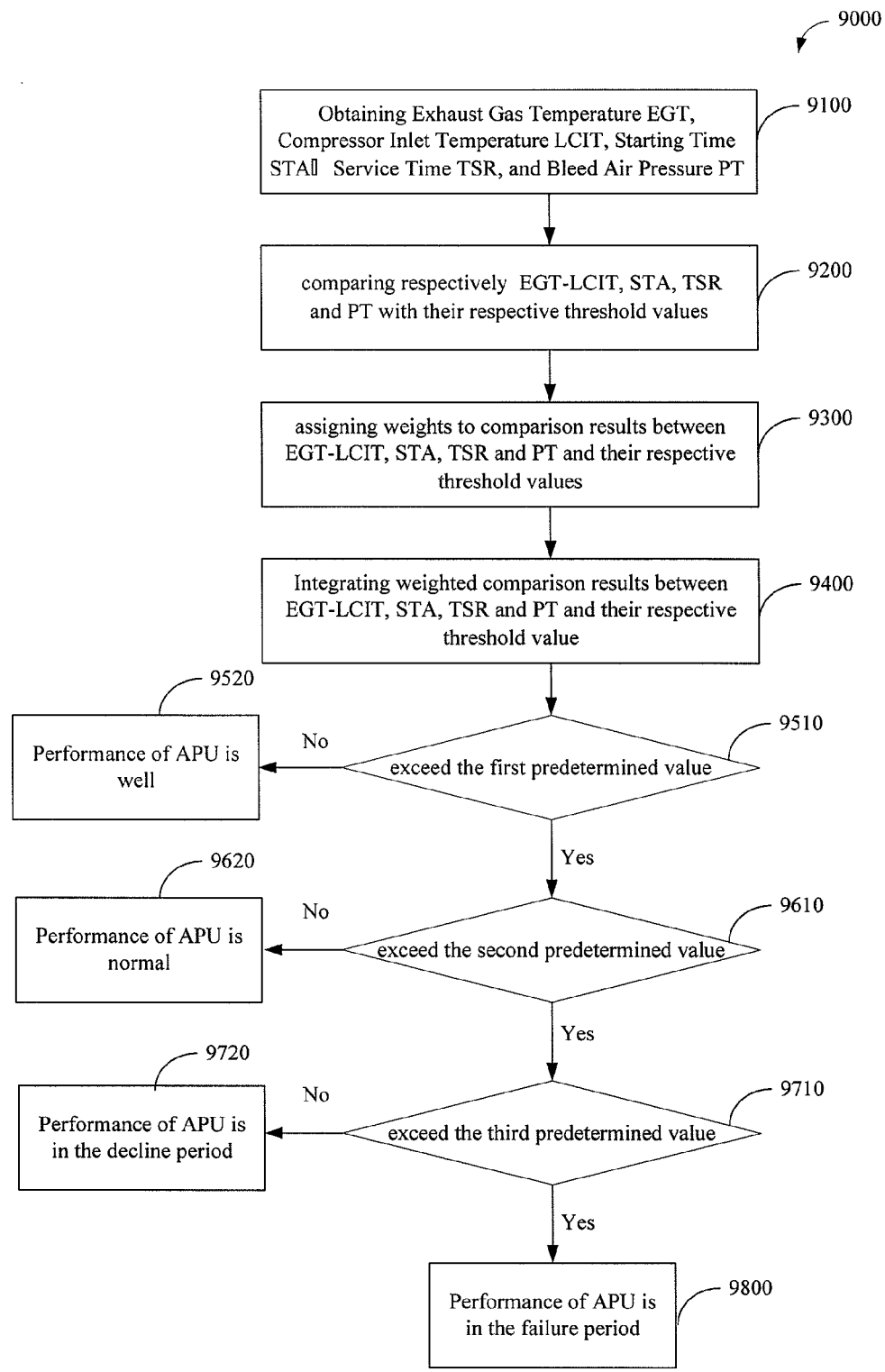
FIG. 9 is a flow chart illustrating a method for detecting the performance of the APU according to one embodiment of the present application.

FIG. 9 is a flow chart illustrating a method for detecting the performance of the APU according to one embodiment of the present application. As shown, in the method 9000 for detecting the performance of the APU in the embodiment, at step 9100, the following operation information of the APU is obtained: EGT, LCIT (Compressor Inlet Temperature), STA (Starting Time), service time TSR and bleed air pressure PT. At step 9200, the difference between EGT and LCIT (i.e., EGT-LCIT), STA, TSR and PT are respectively compared with their respective threshold values. According to one embodiment of the present application, the respective threshold values are extreme values of respective parameters. At step 9300, each comparison result between EGT-LCIT, STA, TSR and PT and their respective threshold values is assigned with a weight. At step 9400, comparison results between EGT-LCIT, STA, TSR and PT and their respective threshold value considering the weight are integrated together. At step 9510, it is determined whether the integrated result exceeds a first predetermined value. If the integrated result does not exceed the first predetermined value, it is determined at step 9520 that the performance of the APU is good; and at step 9610, it is determined whether the integrated result exceeds a second predetermined value. If the integrated result does not exceed the second predetermined value, it is determined at step 9620 that the performance of the APU is normal, and at step 9710, it is determined whether the integrated result exceeds a third predetermined value. If the integrated result does not exceed the third predetermined value, it is determined at step 9720 that the performance of the APU is in the decline period. If the integrated result exceeds the third predetermined value, it is determined at step 9800 that the performance of the APU is in the fault period.

According to one embodiment of the present application, the information required at step 9100 can be obtained from the APU message such as the A13 message. For example, the A13 message of the operation status of the aircraft's APU can be obtained remotely from SITA (Société Internationale de Télécommunications Aéronautiques) network control center and ADCC (Aviation Data Communication Corporation) network control center in real time, and the obtained A13 message of the operation status of the aircraft's APU can be decoded by a message decoder so as to obtain the operation information of the aircraft's APU.

If the aircraft data system does not automatically generate the operation status message of the APU, corresponding sensor and trigger condition should be added to generate the desired APU message. If the existing APU message of the aircraft data system does not cover one or more of the EGT, LCIT, STA, TSR and PT, the generating condition of the APU message should be modified to add the lacking one or more parameters. Since the APU message can be transmitted to a data server of an airline in real time via ACARS or ATN, the real time monitoring of the performance of the APU can be achieved. Certainly, the transmission way of the message can avoid high cost and human error caused by the manual way.

According to one embodiment of the present application, the information required at step 9100 can be obtained directly from the aircraft data system without generating the APU message.

At step 9200, the threshold value for the difference of EGT and LCIT (EGT-LCIT) is $EGT_{Redline}$. $EGT_{Redline}$ is an EGT redline value of the APU. $EGT_{Redline}$ depends on the model of the APU. Different models of APUs have different EGT redline values, which can be obtained from related manuals. The threshold value for STA is $STA_{WarningLine}$ which is a performance decline value of the STA and also depends on the model of the APU. The threshold value for TSR is $TSR_{rt}$, which means a corresponding time where the reliability of time-on-wing of a certain model of APU is 70%. The threshold value of PT is $PT_{Min}$, it is the minimum bleed air pressure required by a certain model of APU. Or the threshold value of PT also can be $PT_{BaseLine}$, it is the lowest inherent amount of bleed air of a certain model of APU during normal operation. Comparison between EGT-LCIT, STA, TSR, PT and their respective threshold values can reflect an offset degree between current performance and standard performance of the APU, and further reflect a decline degree of the performance of the APU. $EGT_{Redline}$, $STA_{WarningLine}$ and $PT_{Min}$ or $PT_{BaseLine}$ can be obtained from related aircraft manuals or from manufactures. Certainly, they can be obtained through actual experiment. However, there is certain bias between $TSR_{rt}$ and a standard value in general, since $TSR_{rt}$ is influenced by geography and maintenance environments and other factors. Through long period observation and analysis, the inventor finds that the time-effect model of the APU satisfies Poisson distribution. The desired $TSR_{rt}$ can be obtained from actual data through utilizing Poisson distribution so as to obtain more accurate $TSR_{rt}$. For example, the parameters (such as a mean value) of Poisson distribution followed by the actual TSR can be calculated firstly, and then the corresponding $TSR_{rt}$ where the failure rate is 30% (the security rate is 70%) can be calculated utilizing the obtained parameters of Poisson distribution actually followed by the TSR.

Comparison between EGT-LCIT, STA, TSR, PT and their respective threshold values can be done by calculating the ratio or difference. To facilitate considering weights of respective parameters, the ratios of EGT-LCIT, STA, TSR, PT and their respective threshold values are calculated at step 9200 according to one embodiment of the present application.

EGT-LCIT, STA, TSR and PT have different influence on the performance of the APU, therefore, they need to be assigned with different weights. According to one embodiment of the present application, in case that the ratios of EGT-LCIT, STA, TSR, PT and their respective threshold values are obtained, R1, R2, R3 and R4 are respectively taken as weights of EGT-LCIT, STA, TSR, PT, and R1+R2+R3+R4=1. According to observation and analysis of the inventor, the TSR has the greatest influence, and thus R3 is generally greater than 0.25; EGT-LCIT and STA may have different effects on different models of APU; PT has relative small effects, and R4 is the lowest. According to one embodiment of the present application, as to APS3200 APU, R3=0.35, R2=0.3, R1=0.2, and R4=0.15. As to GTCP131-9A APU, R3=0.35, R1=0.3, R2=0.2, and R4=0.15.

According to one embodiment of the present application, the performance of the APU can be estimated by the following formula:

$$PDI = R1\frac{EGT - LCIT}{EGT_{RedLine}} + R2\frac{STA}{STA_{WarningLine}} + R3\frac{TSR}{TSR_{rt}} + R4\frac{PT_{Min}}{PT} \quad (3)$$

wherein, PDI (Performance Detection Index) is a parameter reflecting the performance of the APU. According to observation and analysis of the inventor, if PDI is less than 0.7, it means the performance of the APU is well; if the PDI is greater than 0.7 but less than 0.85, it means the performance of the APU is normal; and if the PDI is greater than 0.85, it means the performance of the APU is poor and in the decline period. If PDI is close to 1, for example PDI is greater than 0.95, it means the APU is in the failure period and failures may occur at any time. Therefore, an example of the first predetermined value at step 9510 is 0.7, an example of the second predetermined value at step 9610 is 0.85, and an example of the third predetermined value at step 9710 is 0.95.

The method in the above embodiment of the present application is further discussed through two examples hereinafter.

EXAMPLE 1

The related information of the APS3200 APU is as follows: $EGT_{Redline}=682$, $STA_{WarningLine}=90$, $PT_{Min}=3$, $TSR_{rt}=5000$. The weight parameters respectively are R1=0.2, R2=0.3, R3=0.35, R4=0.15.

The APU message of the aircraft is obtained remotely from SITA network control center or ADCC network control center in real time, and the obtained APU message of the aircraft is decoded by an ACARS message decoder so as to obtain the operation information of the aircraft APU including: EGT: 629, LCIT:33, STA:59, TSR (time-on-wing):4883 and PT:3.66. According to the following formula:

$$PDI = R1\frac{EGT - LCIT}{EGT_{RedLine}} + R2\frac{STA}{STA_{WarningLine}} + R3\frac{TSR}{TSR_{rt}} + R4\frac{PT_{Min}}{PT}$$

it is calculated that PDI=0.85. Therefore, it is determined that the performance of the APU is in the decline period, and maintenance of the APU of the aircraft should be planned.

EXAMPLE 2

The related information of the GTCP131-9A APU is as follows: $EGT_{Redline}=642$, $STA_{WarningLine}=60$, $PT_{Min}=3.5$, $TSR_{rt}=5000$. The weight parameters respectively are R1=0.3, R2=0.2, R3=0.35, R4=0.15.

The APU message of the aircraft is obtained remotely from SITA network control center or ADCC network control center in real time, and the obtained APU message of the aircraft is decoded by an ACARS message decoder so as to obtain the operation information of the aircraft APU including: EGT=544, LCIT=31, STA=48, TSR=2642 and PT=3.76. According to the following formula:

$$PDI = R1\frac{EGT - LCIT}{EGT_{RedLine}} + R2\frac{STA}{STA_{WarningLine}} + R3\frac{TSR}{TSR_{rt}} + R4\frac{PT_{Min}}{PT}$$

it is calculated that PDI=0.72. Therefore, it is determined that the performance of the APU is normal, and the APU can be used normally.

Compared with the prior art, in the method of the above embodiment of the present application, EGT, LCIT, STA, TSR and PT are obtained in real time, the PDI is obtained according to the above formula, and then the obtained PDI is compared with the predetermined value, therefore, the method can accurately determine the performance of the APU based on the comparison between the PDI and the predetermined value. In addition, the ACARS message of operation status of the aircraft APU is obtained remotely in real time, which can reduce working load and enhance the work efficiency, compared with obtaining manually.

The altitude and temperature can influence measuring results of the EGT and PT. According to one embodiment of the present application, the measured EGT and PT is converted into values under the standard condition and thus to remove the effect of altitude and temperature, so as to more accurately detect the performance of the APU. For example, the altitude of 0 meter and the temperature of 50° C. can be selected as the standard condition, and other altitude and temperature also can be e selected as the standard condition.

According to one embodiment of the present application, under the standard condition having the altitude of 0 meter and the temperature of 50° C., the correction formula of the PT is as follows:

$$PT = PT_{std} \times e^{\frac{ALT \times 0.3048}{1000} \cdot \frac{1}{R(TAT+273.15)} \cdot \frac{1}{mg}} \quad (4)$$

wherein, $PT_{std}$ is the pressure under the altitude of 0 meter, ALT is the altitude or the standard altitude, TAT is the ambient temperature or total temperature, m is the air quality and can be 29, g is 10 m/s², R is the adjustment parameter and can be 8.51.

Therefore, the correction coefficient δ of the altitude pressure is:

$$\delta = e^{\frac{ALT \times 0.3048}{1000} \cdot \frac{1}{R(TAT+273.15)} \cdot \frac{1}{mg}}$$

Considering the effect of the temperature, the final correction formula of the PT is as follows:

$$PT_{cor} = \frac{PT}{\delta} + \Delta PT \quad (5)$$

wherein, $PT_{cor}$ is the corrected bleed air pressure, $\Delta PT$ is a function related to the temperature and can be calculated by the following formula:

$$\Delta PT = a1\,TAT^2 + b1\,TAT + c1 \quad (6)$$

wherein, TAT is the ambient temperature, a1, b1 and c1 are adjustment coefficient and can be measured through experiments. According to one embodiment of the present application, a1 has an order of $10^{-5}$, b1 has an order of $10^{-2}$, and c1 is between 0 and −1.

When a1, b1 and c1 can be obtained through experiments, the measured PT can be converted into the corrected $PT_{cor}$ under the standard status according to formula (6).

The correction formula of EGT is as follows:

$$EGT_{cor} = EGT + \Delta EGT + p1\frac{PT}{\delta} + p2(PT_{cor} - PR_{Req}) \quad (7)$$

Wherein, $EGT_{cor}$ is the EGT under the standard condition, $\Delta EGT$ is the function related to the temperature, $PT_{Req}$, that is $PT_{Min}$ is the lowest bleed air pressure required when the engine is started, p1 and p2 are the adjustment coefficient. According to one embodiment of the present application, the range of values of the p1 is 20-60, the range of value of the p2 is 70-100. The specific values of p1 and p2 can be obtained through experiments. For example, different EGTs can be obtained at different altitudes, maintaining a certain power output and temperature of 50° C. Then, the measured EFTs are compared with the EGT under the temperature of 50° C. and under sea level pressure, and the changes of the EGT and the temperature are regressed, so that the adjustment coefficient in the correction formula can be obtained.

$\Delta EGT$ can be calculated from the following formula:

$$\Delta EGTA = a2TAT^2 + b2TAT + c2 \quad (8)$$

wherein, TAT is the ambient temperature, a2, b2 and c2 are adjustment coefficients and can be measured through experiments. According to one embodiment of the present application, the range of a2 is 0.005-0.02, the range of b2 is 0.5-2.5 and the range of c2 is 60-100.

When adopting the corrected EGT and PT, the formula (3) can be rewritten as the following:

$$PDI = R1\frac{EGT_{cor}}{RGT_{RedLine}} + R2\frac{STA}{STA_{WarningLine}} + R3\frac{TSR}{TSR_{rt}} + R4\frac{PT_{req}}{PT_{cor}} \quad (7)$$

According to one embodiment of the present application, as to the corrected PDT, if the corrected PDI is less than 0.7, it means the performance of the APU is well; if the corrected PDI is greater than 0.7 but less than 0.8, it means the performance of the APU is normal; if the corrected PDI is greater than 0.8, it means the performance of APU is poor and is in the decline period. And if PDI is greater than 0.85, it indicates that APU is in the failure period. Therefore, an example of the first predetermined value at step 6510 is 0.7, an example of the second predetermined value at step 6610 is 0.8, and an example of the third predetermined value at step 6710 is 0.85.

Figure 10:
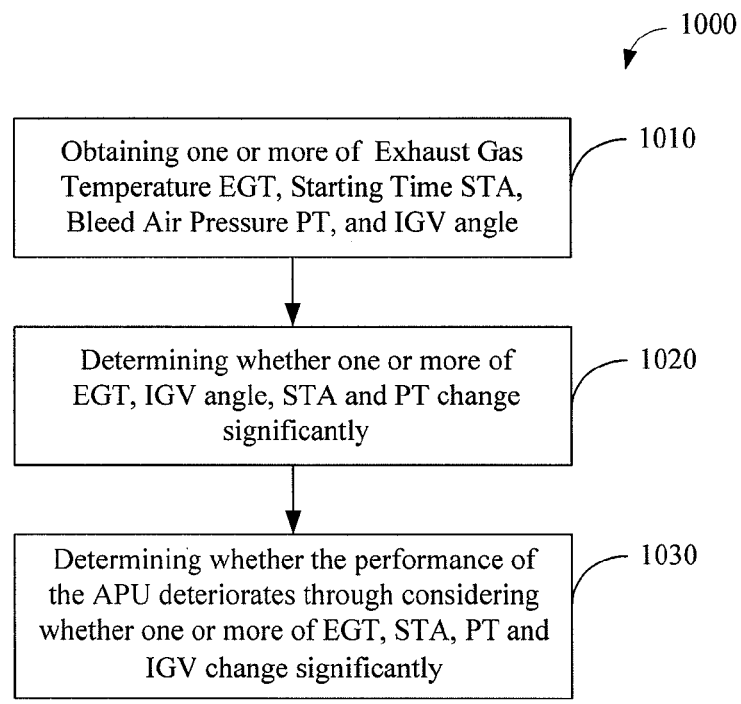
FIG. 10 is a flow chart illustrating a method for detecting the performance of the APU according to another one embodiment of the present application.

FIG. 10 is a flow chart illustrating a method for detecting the performance of the APU according to another one embodiment of the present application. As shown, in the method 1000 for detecting the performance of the APU in the embodiment, at step 1010, one or more of the following operation information of the APU are obtained: EGT, STA, PT and the IGV angle. The method for obtaining operation information of the APU shown in FIG. 9 can be applied in this embodiment.

According to the operation principle of the APU, the EGT (APU Exhaust Gas Temperature) is an important parameter reflecting the performance of the APU. Since the EGT directly reflect the heat energy conversion efficiency of the whole APU when the APU operates at constant rotation speed. The lower the heat energy conversion efficiency of the APU is, the higher the value of the EGT is. Since the control system of the APU can control the fuel oil valve and the inlet angle of the IGV to ensure overheat will not occur, the PT and the angle of the IGV in the APU parameters can reflect change indicating the APU is close to overheat status and need to be prevented from overheating. The STA is a parameter reflecting the overall performance of the APU, which includes the performance of the starting motor, the performance of the gearbox, the efficiency of the compressor unit and power unit (i.e., one compressor and two stages of turbines). The current performance and changing trend of the APU can be reflected through monitoring the four key parameters EGT, IGV, STA and PT. Moreover, respectively monitoring the parameters also contributes to determine the failure sources and find hidden failures.

At step 1020, it is determined whether one or more of EGT, IGV angle, STA and PT change significantly. When one or more of EGT, IGV angle, STA and PT change significantly, it is determined that corresponding parameter deteriorates.

As to the EGT and PT, $EGT_{cor}$ and $PT_{cor}$ mentioned in the above embodiment can replace the directly measured EGT and PT to remove the influence of the altitude and temperature so as to obtain more accurate results.

As the service time passes, the performance of the APU gradually deteriorates. This characteristic of performance parameters of the APU can be reflected by the following formula:

$$X = \beta 0 + \beta 1 t_0 \quad (10)$$

wherein, X is any one of the EGT, STA, PT and IGV angle, $t_0$ is the installation time of APU, $\beta 0$ 和 $\beta 1$ are fitting parameters. $\beta 1$ is the slope reflecting the changing trend of parameters.

According to one embodiment of the present application, a plurality of values of one parameter of EGT, STA, PT and IGV obtained in a certain period are fitted so as to obtain $\beta 1$. $\beta 1$ is compared with the reference slope, and it is determined that said parameter of EGT, STA, PT and IGV changes significantly if there is significant difference between $\beta 1$ and the reference slope. The reference slope is calculated utilizing data of the APU having good operation condition. The data can be the data after initial installation of the same APU and also can be the data of other APU of the same model working well.

According to one embodiment of the present application, after the APU is installed and parameters thereof is initialized, a plurality of initial parameters recorded are averaged and thus respective initial value of every parameter is obtained as their respective reference values. The amount of recorded parameter is 10 or more.

Variations can be obtained through comparison between the subsequent parameters and the reference value. These variations conform to the formula (10). Their slopes also can reflect the changing trend of parameters of the APU. Therefore, in this embodiment, comparing the slope of the variation of one of EGT, STA, PT and IGV relative to its corresponding reference value with the slope of the reference variation, it is determined that said one parameter among EGT, STA, PT and IGV changes significantly, i.e., said parameter deteriorates, if there is significant difference between two slopes.

According to one embodiment of the present application, the values of one parameter of EGT, STA, PT and IGV in two consecutive periods of the same length are compared as independent samples. It is determined that said one parameter changes significantly and deteriorates if the above comparison shows significant difference.

For reducing influence of fluctuation, perform smooth processing to the values of parameters of measured EGT, STA, PT and IGV. According to one embodiment of the present application, perform smooth processing to the values of parameters through adopting multipoint smooth average rolling mean. The amount of multipoint is more than 3. According to one embodiment of the present application, the values of parameters are performed smooth processing according to the following formula:

$$X_{new} = C1 X_{smooth} + C2 X_{old} \qquad (11)$$

wherein, $X_{old}$ is the value before smooth processing, i.e., the measured value, $X_{new}$ is the value after smooth processing, $X_{smooth}$ is the smooth value which can be the value of an adjacent point (such as the previous point) being smooth-processed and also can be the average value of points around the current point (not the current point), C1 and C2 are the weight values and C1 is greater than C2, for example, C1=0.8, C2=0.2.

At step 1030, it is determined whether the performance of the APU deteriorates through considering whether one or more of EGT, STA, PT and IGV change significantly.

According to one embodiment of the present application, it is determined that the performance of the APU deteriorates and the APU is in the decline period if any one of EGT, STA, PT and IGV deteriorates. According to another embodiment of the present application, it is determined that the performance of the APU deteriorates and the APU is in the decline period if STA deteriorates. According to another embodiment of the present application, it is determined that the performance of the APU deteriorates and the APU is in the decline period if any two of EGT, STA, PT and IGV deteriorate. According to another embodiment of the present application, it is determined that the performance of the APU deteriorates and the APU is in the decline period if both of EGT and PT deteriorate.

The method shown in FIGS. 9 and 10 can be used simultaneously to more accurately detect the performance of the APU.

Figure 11:
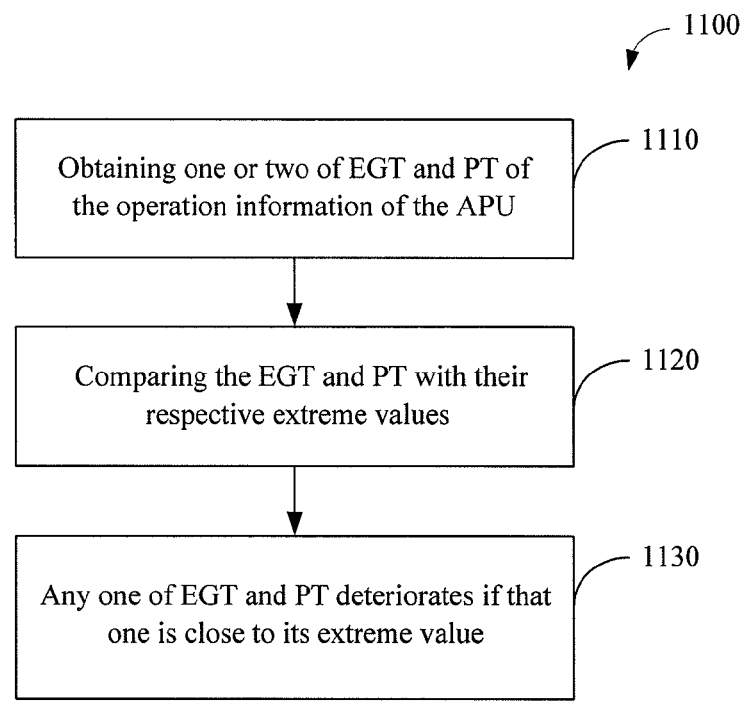
FIG. 11 is a flow chart illustrating a method for detecting the performance of the APU according to further one embodiment of the present application.

FIG. 11 is a flow chart illustrating a method for detecting the performance of the APU according to further one embodiment of the present application. As shown, in the method 1100 for detecting the performance of the APU in the embodiment, at step 1110, one or two of EGT and PT of the operation information of the APU are obtained. The method for obtaining performance information of the APU mentioned above can be applied in this embodiment.

At step 1120, the EGT and PT are compared with their respective limits. In particular, the EGT may be compared with the $EGT_{Redline}$, the PT is compared with the $PT_{Req}$ which is the lowest bleed air pressure required when the engine starts.

At step 1130, it is determined that any one of EGT and PT deteriorates if that one is close to its limit. According to one embodiment of the present application, it is determined that the performance of the APU is in decline period if any one of EGT and PT deteriorates. According to one embodiment of the present application, it is determined that the performance of the APU is in decline period if both of EGT and PT deteriorate.

According to one embodiment of the present application, as to the EGT, the formula is as the following:

$$EGT_{Tolerance} = EGT_{RedLine} - EGT_{cor} \qquad (12)$$

wherein, $EGT_{Tolerance}$ is the margin of the EGT, i.e., the difference between the EGT and the $EGT_{Redline}$. Since the control system of the APU can prevent the EGT from overheating, it means that the APU cannot obtain more power by increasing fuel oil supply when the control system beginning to work. The power of the APU gradually decreases as service time passes, which means the APU is in the decline period. Therefore, it means the APU is in the decline period when the $EGT_{Tolerance}$ is close to 0.

PT is an important parameter when the APU is in the decline period.

According to one embodiment of the present application, as to the PT, the formula is as the following:

$$PT_{Tolerance} = PT_{cor} - PT_{Req} \qquad (13)$$

wherein, $PT_{Tolerance}$ is the margin of the PT, i.e., the difference between the PT and the lowest bleed air pressure required when the engine starts. The magnitude of the $PT_{Tolerance}$ reflects operation status of the APU in the decline period. When $PT_{Tolerance}$ is close to 0, the APU should be replaced.

EXAMPLE 3

It is can be calculated from data of EGT, TAT (External Temperature), ALT (Altitude) and PT obtained from the messages that $EGT_{cor}=654.49$, $PT_{cor}=3.27$. According to the search, the lowest bleed air $PT_{Req}$ required when the engine of the A319 aircraft of Airbus starts is 3.2. It can be obtained according to long term experimental verification that the redline value $EGT_{RedLine}$ of APS3200 APU is 645. It can be obtained from the above evaluation formula that $EGT_{Tolerance}=-9.49$, the degree in which it is close to 0 is 9.49/645, i.e., about 1.4%; $PT_{Tolerance}=0.07$, the degree in which it is close to 0 is 0.07/3.2, i.e., about 2.2%. On that evidence, both of the EGT and PT deteriorate and the APU is in the decline period and should be replaced at right time so as to improve the availability of the flight.

The method shown in FIGS. 9-11 can be used simultaneously to more accurately detect the performance of the APU.

Compared with conventional technology, the method discussed in the embodiment can obtain EGT of the APU, LCIT, STA, TSR, PT and the angle of the IGV in real time, and thus perform detection of the performance of the APU through processing these parameters and determine whether the performance of the APU is in the decline period, which can support the maintenance of the APU for engineers and thus ensure normal operation of the APU so as to avoid delay and grounding of the aircraft. Meanwhile, targeted maintenance and operation control can be performed through evaluation of the performance of the APU, which will significantly reduce maintenance cost.

Example of the Crew Oxygen System

Figure 12:
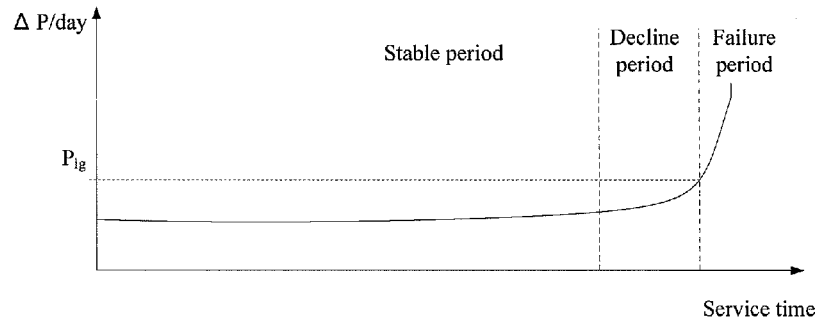
FIG. 12 is a schematic illustrating a performance curve of the crew oxygen system.

FIG. 12 is a schematic illustrating a performance curve of the crew oxygen system. Every oxygen system has a certain level of gas leakage, therefore, when the temperature is fixed, pressure difference $\Delta P$ will be produced at different time. The gas leakage rate could be represented as $P_L = \Delta P/t$. When the gas leakage rate is stable, the performance of the crew oxygen system is in stable period; when the gas leakage ratio $P_L$ gradually increases, the performance of the crew oxygen system enters deterioration period; when the gas leakage ratio $P_L$ is larger than a threshold $P_L g$, the performance of the crew oxygen system enters failure period, failure may happen, which can influence safety of flight and easily causes unscheduled maintenance, and thus result in delay of aircraft and being grounded. In present technology, there is no any means to detect if the crew oxygen system enters deterioration period. However, according to one embodiment of the present invention, this detection is possible.

As to the crew oxygen system, the detection parameter is easily obtained. The pressure of the oxygen cylinder in the crew oxygen system is the best parameter reflecting the performance of the crew oxygen system. Since the pressure of the oxygen cylinder in the crew oxygen system relates to the temperature, the temperature of oxygen in the oxygen cylinder must be obtained at the same time when the oxygen pressure is obtained. However, there is no temperature sensor in the crew oxygen system. Therefore, the temperature of oxygen in the oxygen cylinder needs to be calculated using other measurable temperature.

In consideration of the position of the oxygen cylinder in the crew oxygen system, according to one embodiment of the present invention, the following formula can be used to obtain the oxygen temperature in the oxygen cylinder:

$$T = \frac{k_1 Tat + k_2 Tc}{2} \quad (14)$$

where, Tat is the ambient air temperature or the temperature outside the airplane, Tc is the cockpit temperature, $k_1$ and $k_2$ are adjustment parameters and $k_1+k_2=2$. According to one embodiment of the present invention, $k_1 > k_2$. That is, the oxygen temperature T is related to the ambient air temperature Tat and the cockpit temperature Tc, and the ambient air temperature has greater influence (is more relevant). Certainly, other mean value formulas also can be used to calculate the oxygen temperature.

According to one embodiment of the present invention, $k_1=k_2$. That is, the formula (14) can be changed to:

$$T = k\frac{Tat + Tc}{2} \quad (15)$$

where, k is the adjustment parameter. According to one example of the present invention, k is close to 1. Each of k, $k_1$ and $k_2$ can be obtained through measurement or statistical analysis.

According to one embodiment of the present invention, k=1. Then formula (15) can be changed to:

$$T = \frac{Tat + Tc}{2} \quad (16)$$

The oxygen temperature obtained based on the formula (16), which may be less precise than those calculated from the formula (14) and the formula (15), is enough for the system for detecting the performance of the crew oxygen system in this embodiments of the present invention.

After the oxygen temperature is obtained, the crew oxygen pressure measured under different temperatures can be transformed into the standard state pressure under the standard temperature, so as to make a comparison and calculate the leakage rate. The standard state pressure can be calculated by the following formula:

$$P_s = \frac{T}{T_s}P \quad (17)$$

where, $P_s$ is the standard state pressure, $T_s$ is the standard temperature, P is the obtained oxygen pressure through measurement, T is the oxygen temperature when measuring. The standard temperature can be 25° C. Certainly, the standard temperature also can be other temperature.

Figure 13:
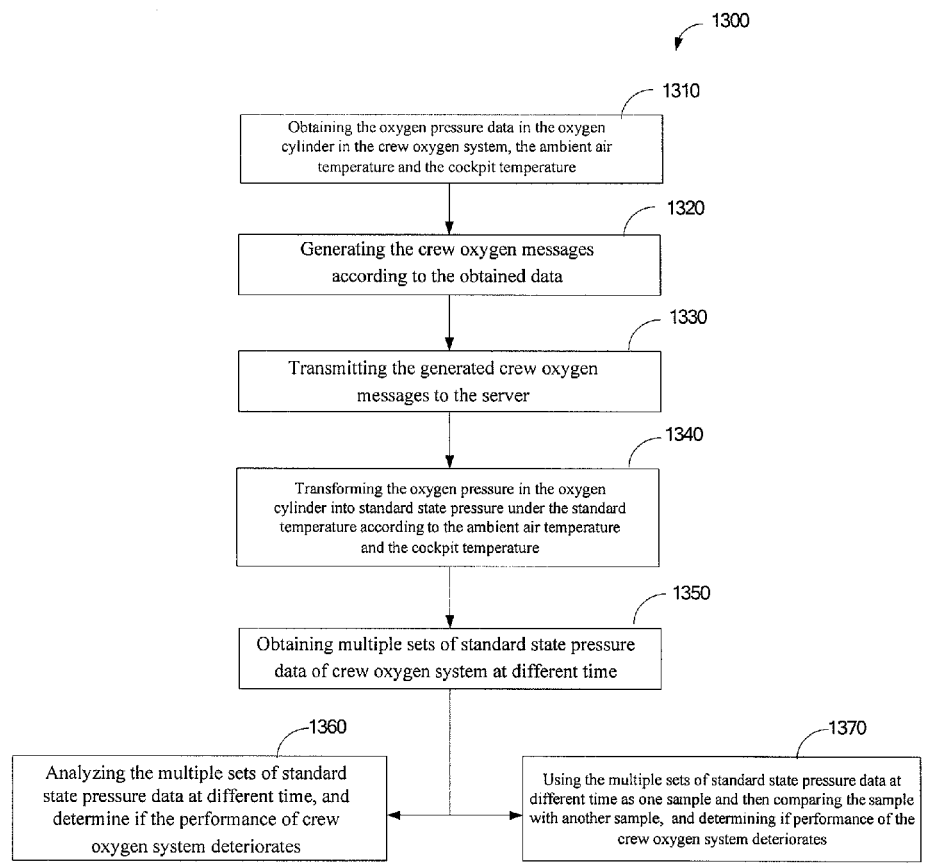
FIG. 13 is a flow chart illustrating a method for detecting the performance of the crew oxygen system according to one embodiment of the present invention.

FIG. 13 is a flow chart illustrating a method for detecting the performance of the crew oxygen system according to one embodiment of the present invention. In the method 1300 for detecting the performance of the crew oxygen system as shown in FIG. 13, at step 1310, the oxygen pressure data in the oxygen cylinder in the crew oxygen system, the ambient air temperature and the cockpit temperature are obtained. At step 1320, crew oxygen messages are generated according to obtained oxygen pressure data in the oxygen cylinder in the crew oxygen system, the ambient air temperature and the cockpit temperature. At step 1330, the generated crew oxygen messages are transmitted to the server for processing crew oxygen messages. At step 1340, the oxygen pressure data in the oxygen cylinder in the crew oxygen system is transformed into standard state pressure under the standard temperature by the server according to the ambient air temperature and the cockpit temperature. The standard temperature can be 25° C. Certainly, the standard temperature also can be other temperature.

As shown in FIG. 13, at step 1350, multiple sets of standard state pressure data of crew oxygen system at different time are obtained in the way of steps 1310-1340. After multiple sets of standard state pressure data of the oxygen of the crew oxygen system at different time are obtained, the performance of the crew oxygen system can be determined by processing and evaluating the obtained data.

At step 1360, the multiple sets of standard state pressure data at different time are analyzed, so as to determine if the performance of crew oxygen system deteriorates. Or, at step 1370, the multiple sets of standard state pressure data at different time serve as one sample and then the sample is compared with another sample of another set of standard state pressure data of the same type of aircraft, so as to determine if performance of the crew oxygen system deteriorates.

According to one embodiment of the present invention, the leg leakage rate is used to determine if performance of the crew oxygen system deteriorates. The leg leakage rate of the crew oxygen system can be calculated by the following formula:

$$P_L = \frac{\Delta P_s}{t} = \frac{P_{s1} - P_{s2}}{t_2 - t_1} \quad (18)$$

where, $t_1$ is take-off time, $t_2$ is landing time, $P_{s1}$ is standard state pressure of the crew oxygen system when aircraft takes-off, $P_{s2}$ is standard state pressure of the crew oxygen system after landing. Therefore, performance of the crew oxygen system can be determined according to the difference $\Delta P_s$ between the standard state pressure of the crew oxygen system before taking-off and that after landing. For example, if the value of $\Delta P_s = P_{s1} - P_{s2}$ is larger than 100 PSI, it means that the performance of the crew oxygen system deteriorates.

Performance of the crew oxygen system also can be determined according to the leg leakage rate. For example, if the leg leakage rate $$P_L = \frac{\Delta P_s}{t} = \frac{P_{s1} - P_{s2}}{t_2 - t_1}$$

is larger that 48 PSI/day, it means the performance of the crew oxygen system deteriorates.

The pressure of the crew oxygen system under a certain temperature can be evaluated according to the calculated leg leakage rate. This can obviously reduce such case, i.e., unscheduled replacement of oxygen cylinder before flight caused by the fact that the aircraft temperature of the aircraft after the flight and the temperature when the engine is cold are greatly different.

According to one embodiment of the present invention, performance of the crew oxygen system can be determined through statistical relation between the oxygen standard state pressure Ps of the crew oxygen system and installation time $t_o$ of oxygen cylinder of the crew oxygen system, and through the calculation of the slope of fitting curves.

The relationship between Ps and $t_o$ meet the following formula:

$$P_s = \beta 1 + \beta 2 * t_o + \mu \quad (19)$$

where, $P_s$ is the standard state pressure, $t_o$ is the installation time of oxygen cylinder of the crew oxygen system, $\beta 1$ is an intercept term which relates to flight time; $\beta 2$ is a slope term which indicates the gas tightness of oxygen system; $\mu$ is a random term which indicates uncertainty between $P_s$ and $t_o$.

Mean value of $t_o$ can be expressed as following:

$$t_{o-avg} = \frac{1}{n} \sum_{l=1}^{l=n} (t_{o1} + \ldots t_{on}) \quad (20)$$

where, n is the number of sampled points which are used in the calculation.

Mean value of $P_s$ can be expressed as following:

$$P_{s-avg} = \frac{1}{n} \sum_{l=1}^{l=n} (P_{s1} + \ldots P_{sn}) \quad (21)$$

where, n is the number of sampled points which are used in the calculation.

$\beta 2$ also can be determined by the following formula according to formulas (6)-(8):

$$\beta 2 = \frac{\sum_{l=1}^{n} (t_{ol} - t_{o-avg}) * (P_{sl} - P_{s-avg})}{\sum_{l=1}^{l=n} (t_{ol} - t_{o-avg})^2} \quad (22)$$

The $\beta 2$ is a negative value. The smaller the value of $\beta 2$ is, the worse the air tightness of crew oxygen system is. The performance of crew oxygen system can be determined through detecting change of $\beta 2$, i.e., the slope term. The performance of crew oxygen system also can be determined through making a comparison between slope terms of different aircrafts.

When performing performance detection of crew oxygen system using above slope detection method, it would be better if there is no replacement of oxygen cylinder or oxygenating in the period represented by data points which are used in the calculation.

According to one embodiment of the present invention, the deterioration of the performance of the crew oxygen system can be determined through the independent sample test to leakage rate.

Since the interval of flight leg time is short, the change of system pressure may be slight, the obtained standard state pressure fluctuates greatly sometimes due to the influence by the fitting accuracy of external temperature and detection accuracy of the pressure sensor. For reducing the influence by the accuracy of external temperature and accuracy of the pressure sensor, one embodiment of the present invention does not use the leg leakage rate, but uses two points which are more than 24-hour apart to compare the pressure at those two points, that is, adopts the 24-hour interval leakage rate $P_{L24}$. Certainly, other intervals also can be adopted, such as an interval which is greater than 12-hour or 36-hour. Meanwhile, for removing bad data point effect caused by sampling, $P_{L24}$ may be 3 days rolling average which means the average value is calculated from all of $P_{L24}$ in 3 days. The person skilled in the art can understand that 3 days is only an example, other days, such 2-4 days also can be used based on special data condition.

According to one embodiment of the present invention, the 24-hour interval 3 days rolling average leakage rate $P_{L-avg24}$, which indicates performance of crew oxygen system, can be calculated by the following formula:

$$P_{L-avg24} = \frac{1}{n} \sum_{l=1}^{l=n} (P_{L24\_1} + \ldots P_{L24\_n}) \quad (23)$$

where, n is the number of data points in 3 days.

According to one embodiment of the present invention, when it is required to know if performance of crew oxygen system changes in a certain period, the data in that period can be selected as a set of samples; meanwhile, another set of data of a aircraft of the same type can be selected as another set of samples. It is determined if the two sets of data are significantly different, through making a comparison between respective $P_{L-avg24}$ of two sets of samples, according to the statistical probability, so that the period and degree of deterioration of performance of crew oxygen system can be determined.

According to one embodiment of the present invention, respective $P_{L-avg24}$ of two sets of data and variance of $P_{L-avg24}$ are calculated firstly. Assume $S1^2$ is the variance of the first set of PL-avg24 (including n data), $S2^2$ is the variance of the second set of $P_{L-avg24}$ (including m data). Since $S1^2/S2^2$ should follow F (n−1, m−1) distribution, the value of F can be determined by searching the F distribution table. It can be determined if the difference between two sets of data is significant according to the value of F. If the probability that the two sets of data belong to the same distribution is less than 2.5%, it can be determined that the difference of two sets of data is significant.

It can be determined if the difference between two sets of data is significant through other independent sample T test. If the difference is significant, it can be determined there is significant change on performance of crew oxygen system. Given it is determined there occurs significant change on performance of crew oxygen system, it is easy to determine which set of data indicates that the performance of crew oxygen system deteriorate according to the average value of leakage rate.

The independent sample test for average leakage rate either uses data at different time of the same aircraft, or uses data of a different aircraft of the same type. Therefore, this method is flexible. Moreover, this detection manner is not limited by replacement of oxygen cylinder and oxygenation, and can be used to determine if significant change occurred on performance of crew oxygen system between before and after replacement of oxygen cylinder and oxygenating.

Hereinafter, how to determine if significant change occurs to the performance of crew oxygen system using the method of the present invention is described through some embodiments.

Figure 14:
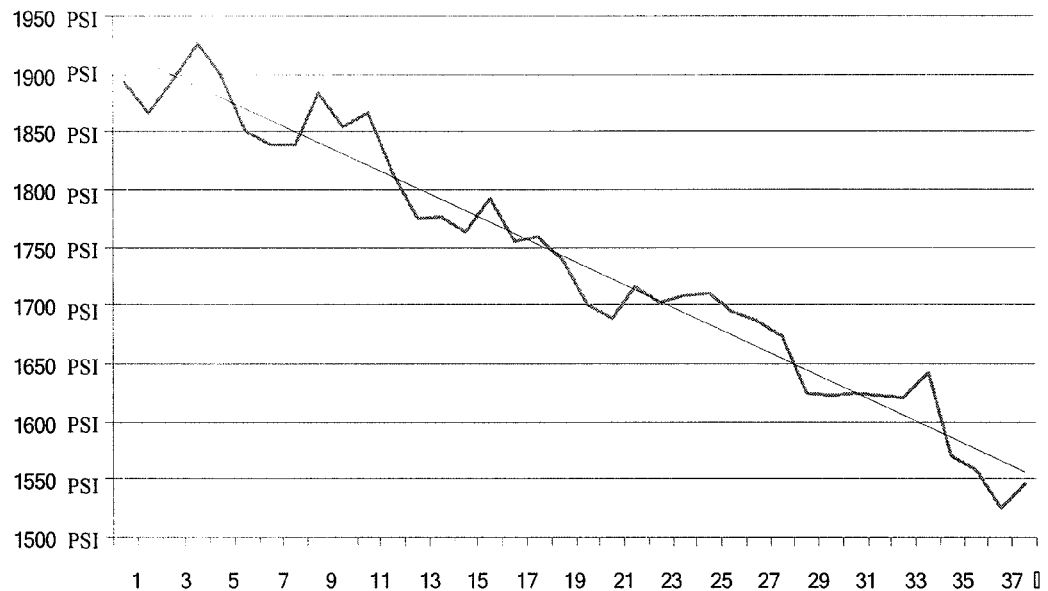
FIG. 14 is a schematic illustrating the relationship between the oxygen pressure in the oxygen cylinder under standard condition and measuring time according to one embodiment of the present invention.

FIG. 14 is a schematic illustrating the relationship between standard state pressure of oxygen in the oxygen cylinder of the crew oxygen system and measuring time according to one embodiment of the present invention. The curve shown in FIG. 14 indicates the standard state pressure of actual sampling and transforming, straight line indicates regression line according to the standard state pressure of oxygen and measuring time. It can be found using the formula (22) of slope detection method that leakage rate of crew oxygen system is large, slope is −0.024929 which is much lower than a normal slope −0.015. This indicates performance of crew oxygen system deteriorates and has entered deterioration period.

Figure 15:
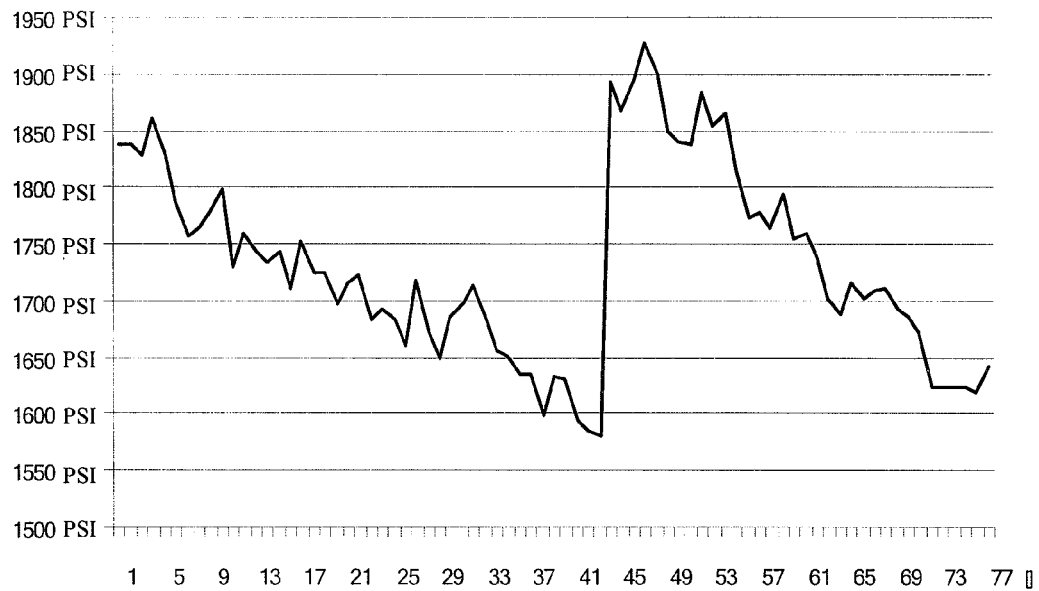
FIG. 15 is a schematic illustrating the relationship between the oxygen pressure in the oxygen cylinder under standard condition and measuring time according to one embodiment of the present invention.
Figure 16:
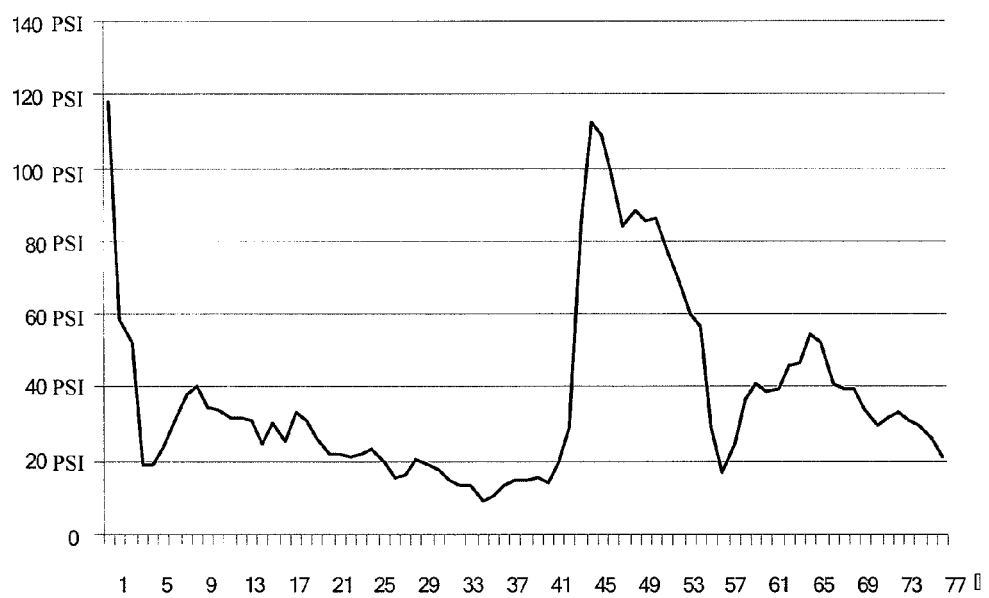
FIG. 16 is a schematic illustrating the relationship between a 24-hour 3-days rolling average leakage rate of the crew oxygen system rate and measuring time according to the embodiment shown in FIG. 15.

FIG. 15 is a schematic illustrating the relationship between standard state pressure of oxygen in the oxygen cylinder of the crew oxygen system and measuring time according to one embodiment of the present invention. FIG. 15 shows a process of replacement of oxygen cylinder of crew oxygen system. The dots shown in FIG. 15 indicate the standard state pressure representing actual sampling and transforming FIG. 16 is a schematic illustrating the relationship between a 24-hour 3-days rolling average leakage rate and measuring time of oxygen in the oxygen cylinder of the crew oxygen system according to the embodiment shown in FIG. 15. Two sets of data obtained respectively before and after replacement of oxygen cylinder serve as two samples, and independent sample T test is used to determine if the two samples are identical. The calculation results indicate the probability that two sets of data obtained respectively before and after replacement of oxygen cylinder are identical is zero. The performance of crew oxygen system degrades, and the average leakage rate doubles. The performance of crew oxygen system has entered deterioration period.

It can be seen from FIGS. 14-16, the method described in the present invention can determine if performance of crew oxygen system degrades and enters deterioration period or failure period of crew oxygen system, through processing and analyzing oxygen pressure data of crew oxygen system and temperature data obtained from crew oxygen messages, and through calculation of slope or independent sample T test and like.

Figure 17:
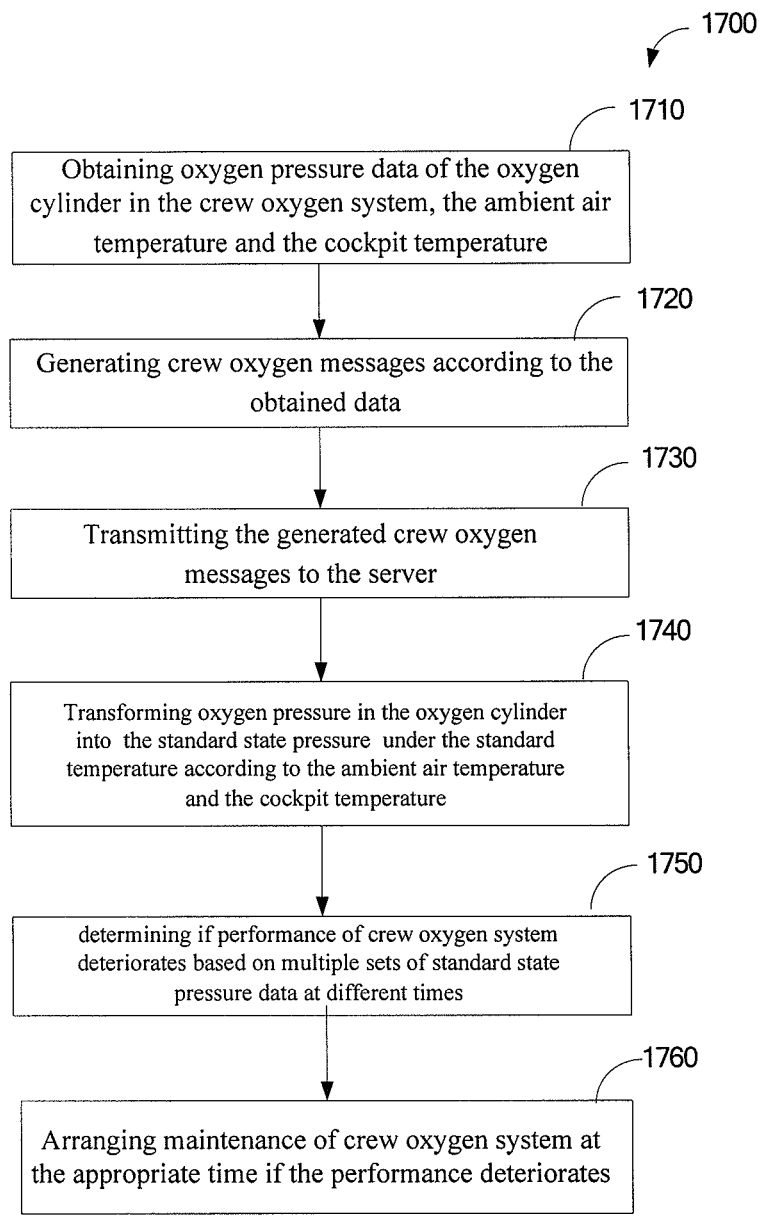
FIG. 17 is a flow chart illustrating a method for maintaining the aircraft crew oxygen system according to one embodiment of the present invention.

FIG. 17 is a flow chart illustrating a method for maintaining the aircraft crew oxygen system according to one embodiment of the present invention. In the method 1700 for maintaining the aircraft crew oxygen system shown in FIG. 17, at step 1710, oxygen pressure data of the oxygen cylinder in the crew oxygen system, the ambient air temperature and the cockpit temperature are obtained. At step 1720, oxygen messages are generated from obtained oxygen pressure data of the oxygen cylinder in the crew oxygen system, the ambient air temperature and the cockpit temperature. At step 1730, the generated crew oxygen messages are transmitted to the server. At step 1740, the crew oxygen messages are processed by the server to obtain standard state pressure of oxygen cylinder of the crew oxygen system under the standardized temperature. At step 1750, it can be determined if performance of crew oxygen system deteriorates based on multiple sets of standard state pressure data at different times. At step 1760, if performance of crew oxygen system deteriorates, maintenance of crew oxygen system at the appropriate time is arranged.

The above embodiments of the invention have been disclosed for illustrative purposes and the invention is not to be limited to the particular forms or methods disclosed. Those skilled in the art will appreciate that various modifications, additions and substitutions are possible. Therefore, the invention is to cover all modifications, equivalents and alternatives falling within the scope of the appended claims.

The invention claimed is:

1. A computerized method for detecting whether performance of an aircraft component is in a decline period, comprising:
   obtaining one or more detection parameters reflecting operation status of the aircraft component and storing the detection parameters in a memory store;
   comparing data of the one or more detection parameters with respective predetermined values, at least one of said values provided as a reference slope of a change trend of at least one detection parameter, and wherein the step of comparing comprises calculating a slope of a change trend of the measured values of the one or more detection parameters in a period;
   using a processor to determine whether the performance of the aircraft component is in the decline period based on the comparison results; and
   performing a smooth processing on the measured values of at least one of the detection parameters,
   wherein the smooth processing adopts following formula:

$$X_{new} = C1 X_{smooth} + C2 X_{old}$$

wherein, $X_{old}$ is the measured value, $X_{new}$ is a value after the smooth processing, $X_{smooth}$ is a value of adjacent points after the smooth processing or is an average value of several adjacent points, C1 and C2 are weighted values.

2. A method according to claim 1, wherein, the step of obtaining comprises:
   obtaining multiple parameters related to operation status of the aircraft component;
   associating data of the multiple parameters with failure events of the aircraft component; and
   determining the detection parameters based on the associations between the multiple parameters and the failure events.

3. A method according to claim 2, wherein, the steps of associating data of the multiple parameters with failure events of the aircraft component and determining the detection parameters based on the associations comprising:
   calculating correlations between data changes of the multiple parameters and the failure events; and
   setting one or more parameters, which have greater correlations than a threshold, of the multiple parameters as the detection parameters.

4. A method according to claim 3, wherein, a range of the threshold is 0.3-0.5.

5. A method according to claim 3, wherein, a range of the threshold is 0.5-0.7.

6. A method according to claim 3, further comprising:
   calculating correlations between the multiple detection parameters; and
   removing one or more of the multiple detection parameters based on the correlations between the multiple detection parameters.

7. A method according to claim 1, wherein, the step of obtaining comprises:
   obtaining multiple parameters related to operation status of the aircraft component; and
   determining the detection parameters based on respective physical implications indicated by the multiple parameters.

8. A method according to claim 1, wherein, the predetermined value is an extreme value of the one or more detection parameters; and the step of comparing comprises:
calculating differences or ratios between measured values of one or more detection parameters and their respective extreme values.

9. A method according to claim 8, wherein, the measured values of the one or more detection parameters are replaced with converted values under a specific condition.

10. A method according to claim 8, wherein, the step of determining comprises:
determining whether the measured values of the one or more detection parameters are close to or exceed the respective extreme values.

11. A method according to claim 8, further comprising:
assigning a weight to the ratio between the measured value of each of the one or more detection parameter and the respective extreme value.

12. A method according to claim 11, further comprising:
obtaining the weight of each detection parameter based on a correlation between data change of the multiple detection parameters and the failure events of the aircraft component.

13. A method according to claim 11, wherein, the step of determining comprises:
integrating the weighted ratios of the measured values of the multiple detection parameters to the extreme values thereof to obtain performance reference values of the aircraft component.

14. A method according to claim 13, further comprising
determining the performance of the aircraft component is in the decline period if the reference value of the aircraft component is greater than a threshold value.

15. A method according to claim 1, wherein, the predetermined value is a reference slope of a change trend of a plurality of detection parameters.

16. A method according to claim 15, further comprising:
comparing the slope of a change trend of the measured values of the one or more detection parameters in a period with the reference slope to determine whether there is significant difference between them.

17. A method according to claim 16, wherein, the step of determining whether the performance of the aircraft component is in the decline period based on the comparison result comprises:
determining the performance of the aircraft component is in the decline period if there is significant difference between the slope of a change trend of the measured values of the one or more detection parameters in a period and the reference slope.

18. A method according to claim 15, wherein, the reference slope is a slope of change trend in a period after the aircraft component is initially installed.

19. A method according to claim 15, wherein, the reference slope is a slope of change trend in a period of the same aircraft component having good working condition in other identical model of aircraft.

20. A method according to claim 15, further comprising:
replacing the measured values of the one or more of the detection parameters with converted values under a specific condition.

21. A method according to claim 1, wherein, the smooth processing adopts a smoothing average algorithm.

22. A method according to claim 1, wherein, the step of comparing:

setting measured values of the one or more detection parameters in a period as a sample;
setting measured values of the one or more detection parameter in a pervious period of the same length as a reference sample; and
determining whether there is significant difference between the sample and the reference sample based on an independent sample test.

23. A method according to claim 22, wherein, the step of determining whether the performance of the aircraft component is in the decline period based on the comparison result comprises:
determining the performance of the aircraft component is in the decline period, if there is significant difference between the sample of the measured values of one or more detection parameters in a period related and the corresponding reference sample.

24. A method according to claim 22, further comprising:
replacing the measured values of the one or more detection parameters with converted values under a specific condition.

25. A method for maintaining an aircraft, comprising:
determining whether the performance of the aircraft component is in the decline period based on the method in claim 1;
arranging a maintenance schedule of the aircraft if the performance of the aircraft component is in the decline period; and
maintaining the aircraft component of the aircraft.

26. A computerized method for obtaining one or more detection parameters reflecting operation status of an aircraft component, comprising:
obtaining multiple parameters related to operation status of the aircraft component and storing the detected parameters in a memory store;
associating data of the multiple parameters with failure events of the aircraft component by monitoring a slope change in the parameters based on measured values, at least one of the parameters provided as a reference slope of a change trend of at least one detection parameter, and wherein the associating comprises calculating a slope of a change trend of the measured value of the one or more detection parameters in a period;
using a processor to determine the detection parameters based on the associations between the multiple parameters and the failure events; and
performing a smooth processing on the measured values of the one or more of the detection parameters,
wherein, the smooth processing adopts following formula:

$$X_{new} = C1 X_{smooth} + C2 X_{old}$$

wherein, $X_{old}$ is the measured value, $X_{new}$ is a value after the smooth processing, $X_{smooth}$ is a value of adjacent points after the smooth processing or is an average value of several adjacent points, C1 and C2 are the weight values.

27. A method according to claim 26, wherein, the step of obtaining comprises:
calculating a correlation between a data change of the multiple parameters and the failure events; and
setting one or more parameters, which have greater correlations than a threshold, of the multiple parameters as the detection parameters.

28. A method according to claim 27, wherein, a range of the threshold is 0.3-0.5.

29. A method according to claim 27, wherein, a range of the threshold is 0.5-0.7.

30. A method according to claim 27, further comprising:
  calculating correlations between the multiple detection parameters; and
  removing one or more of the multiple detection parameters based on the correlations between the multiple detection parameters.

31. A method according to claim 26, wherein, the step of obtaining comprises:
  obtaining multiple parameters related to operation status of the aircraft component; and
  determining the detection parameters based on respective physical meaning indicated by the multiple parameters.

* * * * *